(12) United States Patent
Sintonen

(10) Patent No.: US 7,130,364 B2
(45) Date of Patent: Oct. 31, 2006

(54) INTERFERENCE DEPENDENT ADC HEADROOM ADJUSTMENT

(75) Inventor: Jyri Sintonen, San Diego, CA (US)

(73) Assignee: Nokia Corporation, Espoo (FI)

( * ) Notice: Subject to any disclaimer, the term of this patent is extended or adjusted under 35 U.S.C. 154(b) by 759 days.

(21) Appl. No.: 10/062,622

(22) Filed: Jan. 31, 2002

(65) Prior Publication Data

US 2003/0142768 A1 Jul. 31, 2003

(51) Int. Cl.
*H04L 27/08* (2006.01)
(52) U.S. Cl. .................... 375/345; 330/129; 330/254; 455/234.1
(58) Field of Classification Search ................ 375/345, 375/317; 341/139; 345/255; 455/136, 138, 455/219, 234.1, 239.1, 240.1, 245.1, 247.1, 455/250.1; 330/129, 254
See application file for complete search history.

(56) References Cited

U.S. PATENT DOCUMENTS

| | | | | |
|---|---|---|---|---|
| 5,389,927 A | * | 2/1995 | Turney et al. .............. | 341/139 |
| 5,990,815 A | * | 11/1999 | Linder et al. ............... | 341/131 |
| 6,246,285 B1 | * | 6/2001 | Nishikido .................... | 330/132 |
| 6,314,144 B1 | * | 11/2001 | Moriyama et al. .......... | 375/345 |
| 6,370,133 B1 | * | 4/2002 | Kang et al. ................. | 370/342 |
| 6,392,830 B1 | * | 5/2002 | Malone, Sr. ................. | 360/48 |
| 6,822,692 B1 | * | 11/2004 | Menkhoff .................... | 348/537 |
| 2002/0183028 A1 | * | 12/2002 | Takahashi et al. ....... | 455/232.1 |
| 2005/0047534 A1 | * | 3/2005 | Lindoff et al. .............. | 375/345 |

* cited by examiner

*Primary Examiner*—Temesghen Ghebretinsae
*Assistant Examiner*—Juan Alberto Torres
(74) *Attorney, Agent, or Firm*—Alston & Bird LLP

(57) ABSTRACT

A method, system, and apparatus for adjusting the headroom for a received signal in a radio receiver when the received signal includes a target signal and an interference signal. An amplifier coupled with the received signal outputs an amplified signal, and the amplification level of the amplifier is set by an amplification control signal. An analog-to-digital converter converts the amplified signal to a digital signal. A first digital filter is used to filter the digital signal at a first attenuation factor and produces a first filter output coupled with the amplification control signal. The first filter output is proportional to the magnitude of the interference signal when the interference signal is greater in magnitude than the target signal. A second digital filter is used to filter the digital signal at a second attenuation factor.

18 Claims, 5 Drawing Sheets

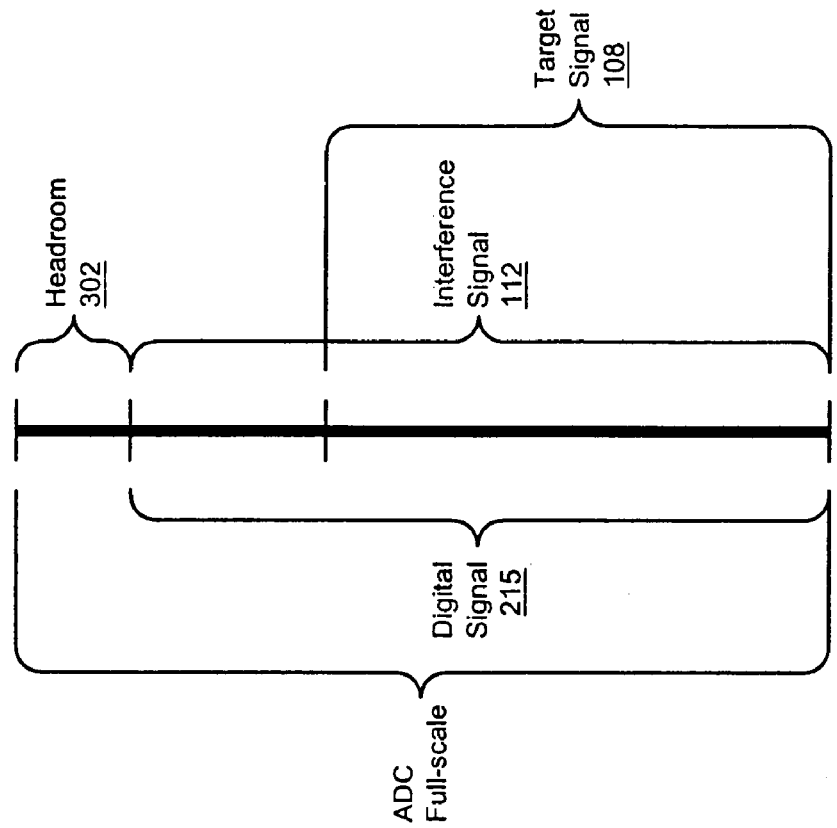
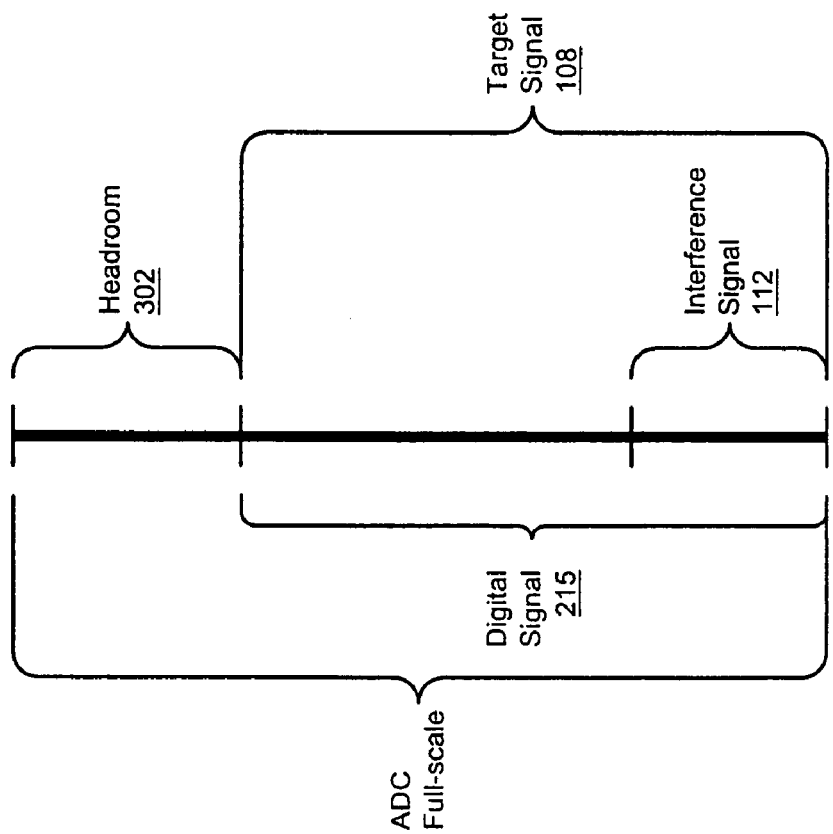

INTERFERENCE DEPENDENT ADC HEADROOM ADJUSTMENT

FIELD OF THE INVENTION

The present invention relates generally to radio communication, and more specifically to system for dynamically adjusting analog-to-digital converter headroom of radio receivers.

BACKGROUND

A communication system is formed, at a minimum, of a sending station and a receiving station interconnected by way of a communication channel. Information generated at the sending station is communicated to the receiving station upon the communication channel. A wide variety of different types of communication systems have been developed and are regularly utilized to effectuate communication of information between sending and receiving stations.

Advancements in communication technologies have permitted the development and construction of new types of communication systems. A radio communication system is exemplary of a type of communication system which has benefited from advancements in communication technologies. A communication channel formed between the sending and receiving stations of a radio communication system is defined upon a radio link. Because a radio link is utilized to form the communication channel, the conventional need of wireline connections between the sending and receiving stations is obviated. Thus, increased mobility is inherent in a radio communication system in contrast to a conventional wireline system.

The communication capacity of a radio communication system, however, is sometimes constricted as a result of bandwidth limitations. Only a limited amount of the electromagnetic spectrum is typically allocated to be used by a particular radio communication system and upon which communication channels can be defined. Communication capacity increase of a radio communication system is, therefore, sometimes limited by such allocation of bandwidth. Increase of the communication capacity of the radio communication system, therefore, is sometimes only possible by increasing the efficiency by which the allocated spectrum is used.

Digital communication techniques are among the advancements in communication technologies which have advantageously been implemented in various communication systems. Digital communication techniques permit the bandwidth efficiency of communications upon a communication channel in a communication system to be increased. Due to the particular need to efficiently utilize the bandwidth allocated in a radio communication system, the use of such digital techniques is particularly advantageously utilized in a radio communication system.

A key operation in digital communication is converting the analog signal received by the receiving station at the receiving antenna to a digital representation of the signal. Such a process typically involves an analog amplifier which increases the amplitude of the analog signal received at the antenna and an analog-to-digital converter (ADC) circuit which transforms the amplified signal to a digital representation of the signal. The resulting output of the ADC is a digital value presented over a data bus representing the analog input signal. The receiving station can then digitally process the digital signal from the ADC.

Generally, the ADC provides a digital signal corresponding to the analog input signal which ranges in value from a minimum value to a maximum value. If the analog input signal increases beyond the ADC's maximum output value, the digital signal remains at the maximum value even though the analog signal is greater than the corresponding digital value. Such a situation is often referred to as "clipping" because the top of the analog signal is not registered by the ADC.

Clipping is highly undesirable in digital communication because it results in lost information. One way to avoid clipping is to control the amplification level of the analog signal at the amplifier before it is input to the ADC. If the signal begins to slowly increase close to the maximum level of the ADC the amplification level is reduced, causing the analog signal to decrease to a safer level. To further insure against clipping, the analog signal is amplified to value smaller than the maximum value of the ADC, leaving a safety margin between the input signal level and the maximum level known as "headroom". Providing a sufficient headroom level ensures that clipping does not occur even when the analog signal quickly jumps in amplitude faster than the receiver can adjust the amplification level of the amplifier.

Although providing headroom between the analog signal and the maximum value of the ADC helps prevent clipping, it also decreases the resolution of the digital signal because less than the full-scale of the ADC is utilized to convert the analog signal to a digital signal. Resolution loss is especially costly when the analog signal includes a high level of interference greater in amplitude than the desired signal. Generally, if the interference is greater than the desired signal, the amplification level and headroom is dictated by the interference signal and not the desired signal. This, in turn, causes the desired signal to receive an even smaller fraction of the ADC's full-scale reading at a lowered digital resolution.

SUMMARY OF THE INVENTION

The present invention addresses the above-mentioned limitations of traditional receiving stations by providing a receiver circuit for dynamically adjusting the headroom level of a received signal in a radio receiver.

One aspect of the present invention is a receiver circuit for adjusting the headroom for a received signal in a radio receiver when the received signal includes a target signal and an interference signal. The circuit includes an amplifier coupled with the received signal such that the amplifier outputs an amplified signal, and the amplification level of the amplifier is set by an amplifier control signal. An analog-to-digital converter is coupled with the amplified signal, such that the analog-to-digital converter outputs a digital signal representing the amplified signal. A first digital filter having a first filter input is coupled with the digital signal. The first digital filter filters the digital signal at a first interference attenuation factor to produce a first filter output coupled with the amplifier control signal. Furthermore, the first filter output is proportional to the magnitude of the interference signal when the interference signal is greater in magnitude than the target signal. The receiver circuit also includes a second digital filter having a second filter input coupled with the digital signal. The second digital filter filters the digital signal at a second interference attenuation factor.

Another aspect of the invention is a method for adjusting the headroom for a received signal in a radio receiver. The method includes an amplifying operation to amplify the received signal at an amplification level. A converting operation converts the amplified signal to a digital signal. Next, a filtering operation digitally filters the digital signal at a first interference attenuation factor to produce a first filter output. The first filter output is proportional to the magnitude of the interference signal when the interference signal is greater in magnitude than the target signal. An adjusting operation is carried out to adjust the amplification level of the received signal based on the first digital filter output such that the difference between the maximum possible digital signal and the amplified signal is decreased when the interference signal is greater than the target signal. Another filter operation digitally filters the digital signal at a second interference attenuation factor.

Yet another aspect of the present invention is a system for adjusting the headroom for a received signal in a radio receiver. The system includes an amplification module for amplifying the received signal at an amplification level to an amplified signal. A conversion module converts the amplified signal to a digital signal. Next, a first filtering module digitally filters the digital signal at a first interference attenuation factor to produce a first filter output proportional to the magnitude of the interference signal when the interference signal is greater in magnitude than the target signal. An adjusting module adjusts the amplification level of the received signal based on the first digital filter output such that the difference between the maximum possible digital signal and the amplified signal is decreased when the interference signal is greater than the target signal. A second filtering module digitally filters the digital signal at a second interference attenuation factor.

The foregoing and other features, utilities and advantages of the invention will be apparent from the following more particular description of various embodiments of the invention as illustrated in the accompanying drawings.

BRIEF DESCRIPTION OF THE DRAWINGS

FIG. 3A illustrates a digital signal when an target signal is greater in magnitude than a interference signal, as contemplated by the present invention FIG. 3B illustrates a digital signal when an interference signal is greater in magnitude than a target signal, as contemplated by the present invention

DETAILED DESCRIPTION OF THE INVENTION

Figure 1:
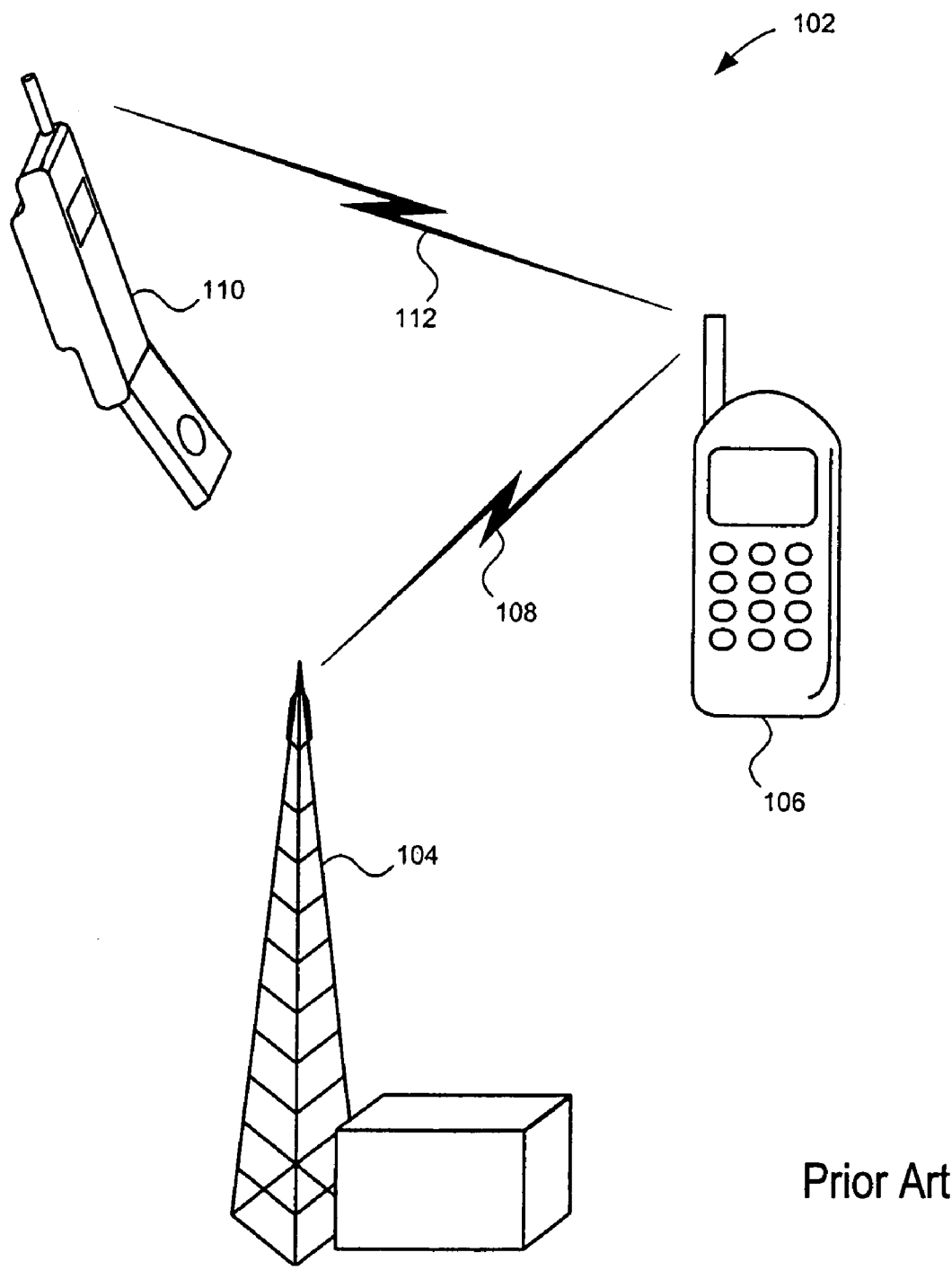
FIG. 1 shows an exemplary communication environment embodying the present invention.

The present invention is a device, system and method for achieving dynamic headroom adjustment in a radio receiver for radio signals containing interference. The invention is described in detail below with reference to FIGS. 1–5. When referring to the figures, like structures and elements shown throughout are indicated with like reference numerals.

In FIG. 1, a simplified communication environment 102 embodying the present invention is shown. The communication environment 102 includes a radio transmitter 104 in radio communication with a radio receiver 106. In other words, the radio receiver 106 receives a target signal 108 from the radio transmitter 104. The radio receiver 106 processes the target signal 108 and conveys the information contained therein to the user. It may be possible that the transmitter 104 can also receive radio signals and that the receiver 106 can also transmit radio signals, but for purposes of this invention only the signal from the transmitter to the receiver is described. Furthermore, it is contemplated that in a particular embodiment of the present invention the radio transmitter 104 is a cellular base station and the radio receiver 106 is a cellular mobile unit, such as a cellular phone.

The environment 102 includes an interferer 110 which transmits an interference signal 112 received by the receiver 106. The interference signal 112 is undesired radio transmission outside the communication system between the transmitter 104 and the receiver 108. For example, the interferer 110 may be a cellular phone in close proximity to the receiver 106 or a cellular base station within the communication environment 102. Furthermore, the interference signal 112 is similar in frequency range to the target signal 108, thereby causing the receiver 106 to receive both the interference signal 112 and the target signal 108. Although only one source of interference is shown in FIG. 1, it is understood that the interferer 110 can represent multiple sources of interference within the communication environment 102.

As detailed further below, when the radio signal received by the receiver 106 contains an interference signal 112 that is greater in magnitude than the target signal 108, the digital resolution of the target signal 108 may decrease substantially. Since the desired information is contained within the target signal 108, some of the desired information is lost when target signal resolution decreases. The present invention is directed toward improving target signal resolution when the received inference signal 112 is greater in magnitude than the received target signal 108.

Figure 2:
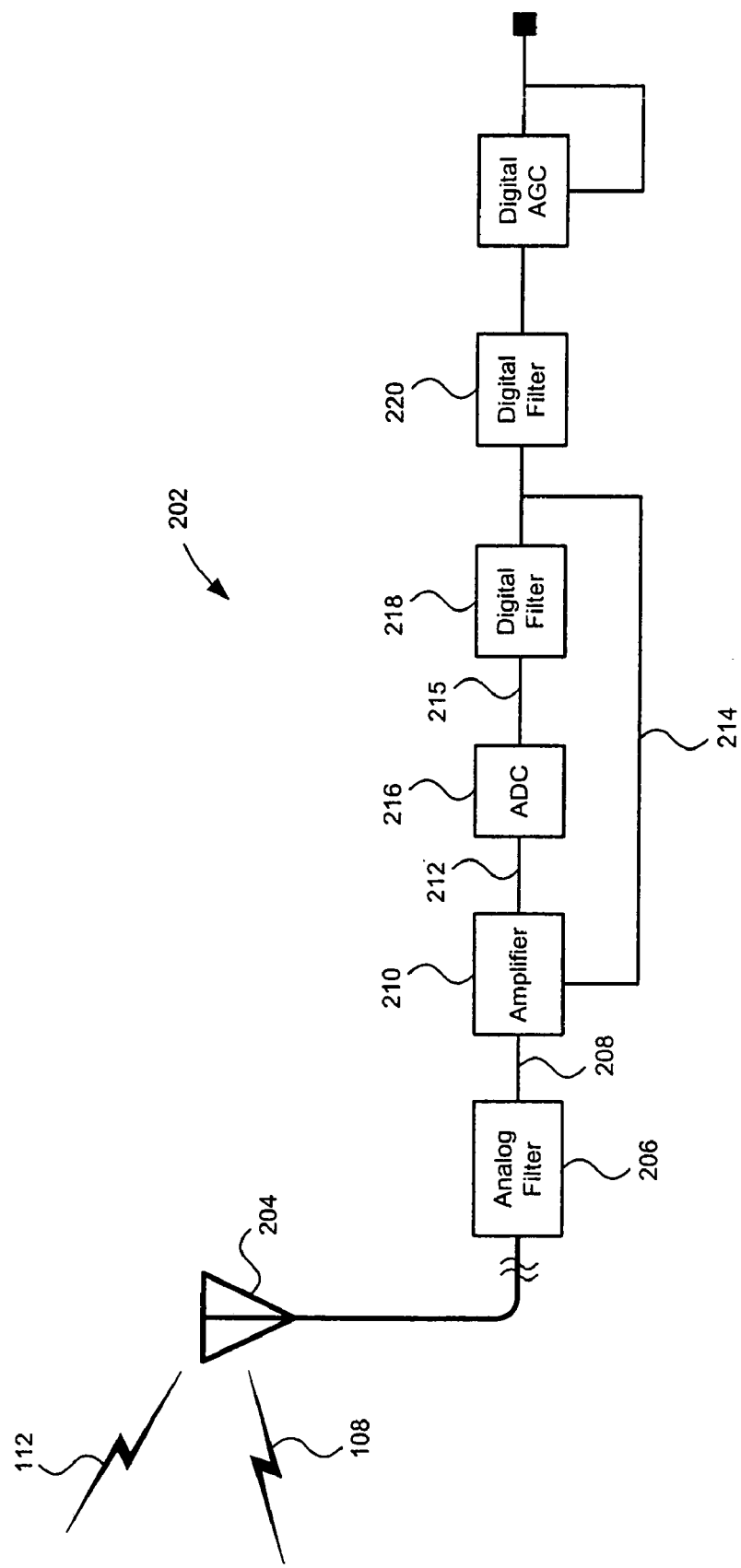
FIG. 2 shows an exemplary receiver circuit as contemplated by the present invention.

FIG. 2 shows one embodiment of a receiver circuit 202 contemplated by the present invention for improving target signal resolution. The receiver circuit 202 includes an antenna 204 for converting the target signal 108 from electro-magnetic energy to electrical energy. The antenna 204 is coupled with an analog filter 206, which is used to reduce the amount of signal and/or noise received outside the target signal's frequency. For example, the analog filter 206 may be a low-pass filter with a slope of 50 dB per 900 KHz. Since the interference signal 112 is similar in frequency range to the target signal 108, however, the analog filter 206 does not prevent at least some of the interference signal 112 from passing. As an example, the target signal 108 may have a frequency range of DC to 630 KHz, while the inference signal 112 may have a frequency range of DC to 900 KHz. Thus, the analog filter 206 outputs a received signal 208 which includes both the target signal 108 and the interference signal 112.

An amplifier 210 is coupled to the received signal 208 such that the amplifier 210 produces an amplified signal 212 at its output. The amplification level of the amplifier 210 is adjustable by means of an amplifier control signal 214. In a particular embodiment of the present invention, the amplifier's gain is linearly proportional to the control signal 214. It is contemplated, however, that the gain may have a different algebraic relationship with the control signal 214. In one embodiment of the invention, the amplifier 210 is an automatic gain control (AGC) amplifier.

The amplified signal 212 is converted to a digital signal 215 using an analog-to-digital converter (ADC) 216. The ADC 216 is coupled with the amplified signal 212 and converts the amplified signal 212 to a digital representation of the signal, such as a binary-coded decimal (BCD) representation. In a particular embodiment of the present invention, the ADC 216 is a sigma-delta analog-to-digital converter. By outputting the digital signal 215, the ADC 216 allows the receiver circuit 202 to digitally process the information contained within the target signal 108.

A first digital filter 218 is coupled with the ADC 216 and receives the digital signal 215 at its input. The first digital filter 218 is configured to generate the amplifier control signal 214 by producing an output proportional to the interference signal 112 when the interference signal 112 is greater in magnitude than the target signal 108. In one embodiment of invention, the first digital filter 218 is a low-pass digital filter having a first interference attenuation factor. For example, the first digital filter may be a low-pass digital filter constructed to attenuate the interference signal 112 at a first interference attenuation factor of 4 dB per 900 KHz.

The output of the first digital filter 218 is additionally coupled with an input to a second digital filter 220. The second digital filter 220 may also be a low-pass digital filter with a second interference attenuation factor. In one embodiment of the invention, the second interference attenuation factor is greater than the first attenuation factor. For example, the second digital filter may be a low-pass digital filter constructed to attenuate the interference signal 112 at a second interference attenuation factor of 24 dB per 900 KHz.

As earlier mentioned, the present invention is directed toward improving target signal resolution when the received inference signal is greater in magnitude than the received target signal. In FIG. 3A, a representation of the digital signal 215 when the target signal 108 is greater in magnitude than the interference signal 112, in accordance with the present invention, is shown. FIG. 3A also shows a headroom level 302 that is maintained to keep the digital signal 215 from reaching the full-scale output of the ADC, thereby preventing signal clipping. In one embodiment of the present invention, an 8 dB headroom level is maintained when the target signal 108 is greater in magnitude than the interference signal 112.

FIG. 3B illustrates the digital signal 215 when the interference signal 112 is greater in magnitude than the target signal 108. As shown, the headroom level 302 is reduced to allow more the ADC's full-scale range to be occupied by the target signal 108. For example, the headroom level may be reduced to 4 dB when the interference signal 112 is greater in magnitude than the target signal 108.

At this point, it should be observed that as the headroom level 302 is decreased, the resolution of the target signal 108 increases because more of the ADC's full-scale range is utilized to convert the target signal 108 to a digital signal. In addition, as the magnitude of the interference signal 112 increases beyond the target signal 108, the resolution of the target signal 108 is further reduced since even a smaller portion of the ADC's full-scale range is occupied by the target signal 108. The present invention helps restore some of the lost target signal accuracy by decreasing the headroom level 302 when the magnitude of the interference signal 112 increases beyond the target signal 108.

Returning back to FIG. 2, the reduction in headroom is effectuated by the first digital filter 218, which attenuates the digital signal 215 when the magnitude of the interference signal 112 increases beyond the target signal 108. The attenuated digital signal drives the amplifier control signal 214, thereby increasing the gain of the amplifier 210. Since the magnitude of the analog signal 208 is increased, the headroom is decreased. By decreasing the headroom the digital accuracy of the target signal 108 is increased.

Figure 4:
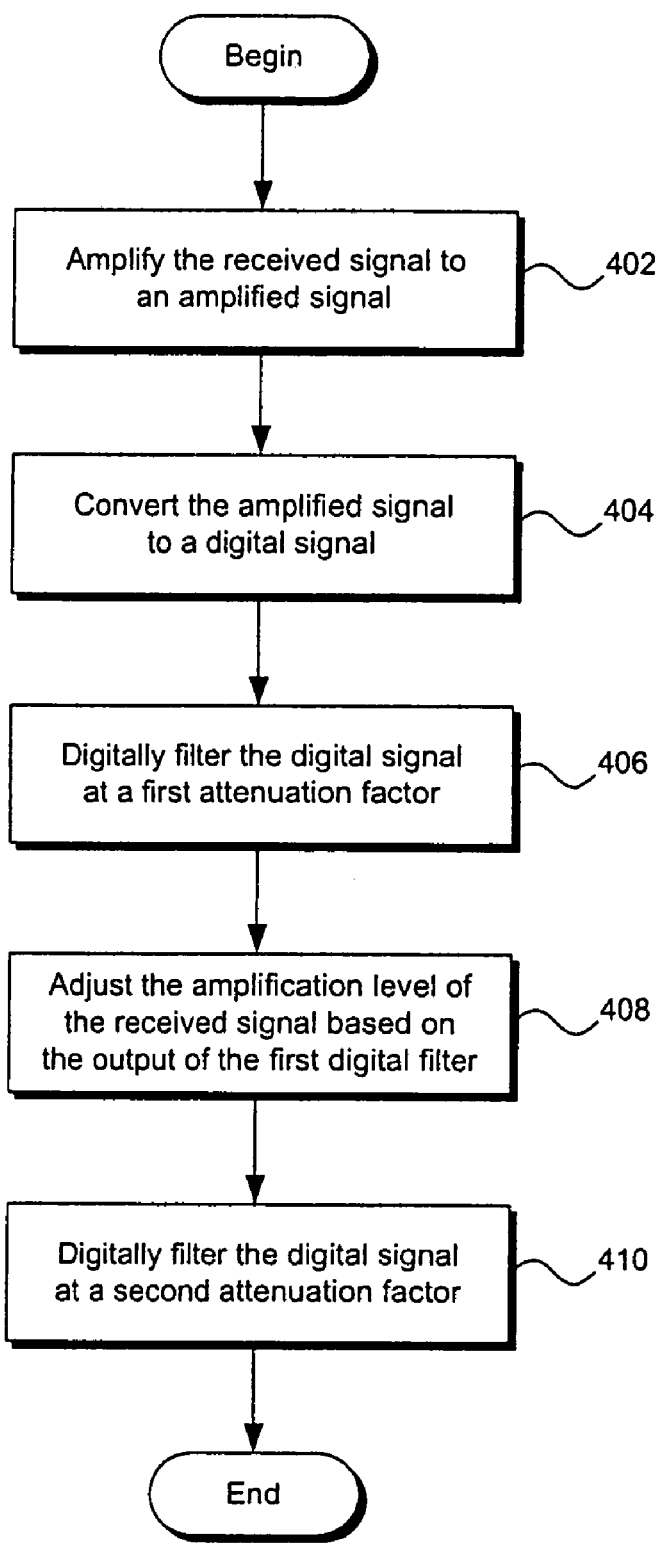
FIG. 4 shows an exemplary flowchart describing the steps taken in adjusting the headroom level of a received signal in a radio receiver, as contemplated by the present invention.
Figure 5:
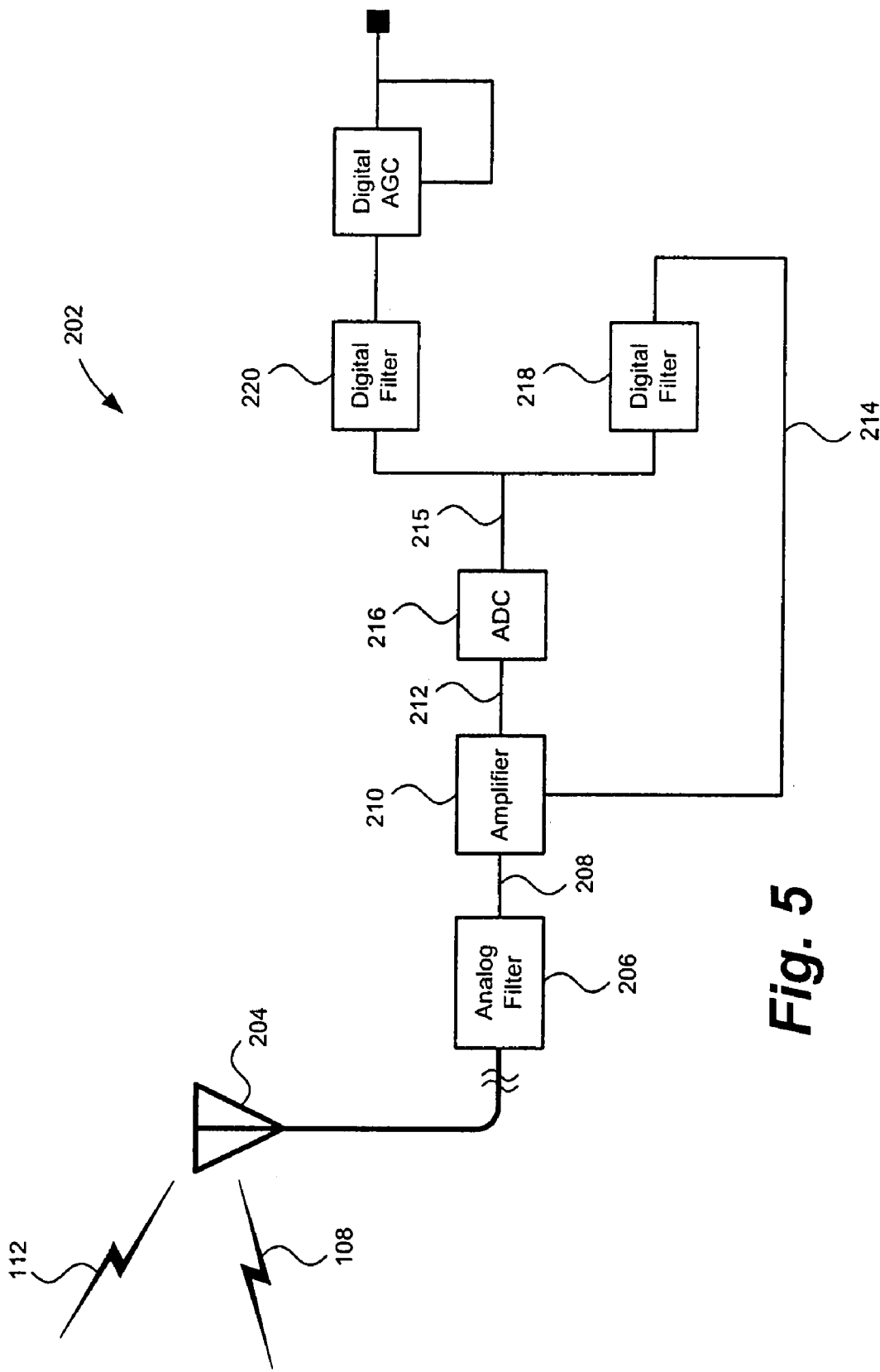
FIG. 5 shows another exemplary receiver circuit, as contemplated by the present invention.

In FIG. 4, a flowchart of an exemplary method for adjusting the headroom level of a received signal in a radio receiver, in accordance with the present invention, is shown. It should be remarked that the logical operations of the flowchart may be implemented (1) as a sequence of computer executed steps running on a computing system and/or (2) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

At amplifying operation 402, the received signal is amplified. The amplification level of the amplifier is variable and proportional to an amplifier control signal. Once the received signal is amplified, an amplified signal is produced and control passes to converting operation 404.

At converting operation 404, the amplified signal is converted to a digital signal. The digital signal is a digital representation of the amplified signal, such as a Binary Coded -Decimal (BCD) representation. For example, a 6-bit ADC may be used to convert the amplified signal to a 6-bit digital signal. Once the converting operation 404 is completed, control passes to filtering operation 406.

In filtering operation 406, the digital signal is digitally filtered at a first interference attenuation factor. The digital filter is configured to produce a first filter output proportional to the magnitude of the interference signal when the interference signal is greater in magnitude than the target signal. After filtering operation 406 is completed, control passes to adjusting operation 408.

At adjusting operation 408, the amplification level of the received signal is adjusted according to the first filter output. As discussed above, this operation increases the amplification level of the received signal when the interference signal is greater in magnitude than the target signal. Consequently, the headroom level is reduced when the interference signal is greater in magnitude than the target signal and a higher target signal resolution is achieved. Once the adjusting operation 408 is completed, control passes to filtering operation 410.

In filtering operation 410, the digital signal is once more digitally filtered at a second interference attenuation factor. The second interference attenuation factor is set greater than the first interference attenuation factor present in filtering operation 406. At this point, the target signal is ready for digital processing by the radio receiver and the method of the present invention is completed.

The foregoing description of the invention has been presented for purposes of illustration and description. It is not intended to be exhaustive or to limit the invention to the precise form disclosed, and other modifications and variations may be possible in light of the above teachings. For example, in FIG. 5, another embodiment of the receiver circuit 202 contemplated by the present invention is shown. In this embodiment, the first digital filter 218 and the second digital filter 220 are connected in parallel circuit to the digital signal 215. Thus, the embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A receiver circuit for adjusting the headroom for a received signal in a radio receiver, the received signal including a target signal and an interference signal, the circuit comprising:
    an amplifier coupled with the received signal such that the amplifier outputs an amplified signal, the amplification level of the amplifier being set by an amplifier control signal;
    an analog-to-digital converter coupled with the amplified signal, the analog-to-digital converter outputting a digital signal wherein the digital signal is a digital representation of the amplified signal;
    a first digital filter having a first filter input coupled with the digital signal, the first digital filter filters the digital signal at a first interference attenuation factor to produce a first filter output, the first filter output comprising the amplifier control signal, the first filter output being proportional to the magnitude of the interference signal when the interference signal is greater in magnitude than the target signal thereby to cause the amplification level set by the amplifier to be proportional to the magnitude of the interference signal; and
    a second digital filter having a second filter input coupled with the first filter output, the second digital filter filters the first filter output at a second interference attenuation factor.

2. The receiver circuit of claim 1, wherein the first digital filter and the second digital filter are low-pass digital filters.

3. The receiver circuit of claim 1, wherein the amplification level of the amplifier is algebraically related to the amplifier control signal.

4. The receiver circuit of claim 1, wherein the amplification level of the amplifier is linearly proportional to the amplifier control signal.

5. The receiver circuit of claim 1, wherein the analog-to-digital converter is a sigma-delta analog-to-digital converter.

6. The receiver circuit of claim 1, wherein the first filter output is proportional to the magnitude of the target signal when the target signal is greater in magnitude than the interference signal.

7. The receiver circuit of claim 1, wherein the second attenuation factor is greater than the first attenuation factor.

8. A method for adjusting the headroom for a received signal in a radio receiver, the received signal including a target signal and an interference signal, the method comprising:
    amplifying the received signal at an amplification level to form an amplified signal;
    converting the amplified signal to a digital signal;
    digitally filtering the digital signal at a first interference attenuation factor to produce a first filter output proportional to the magnitude of the interference signal when the interference signal is greater in magnitude than the target signal;
    adjusting the amplification level at which the received signal is amplified based on the first digital filter output such that the difference between the maximum possible digital signal and the amplified signal is decreased when the interference signal is greater than the target signal and thereby to cause the amplification level to be proportional to the magnitude of the interference signal; and
    digitally filtering the digital signal at a second interference attenuation factor.

9. The method of claim 8, further comprises digitally filtering the digital signal at the first interference attenuation factor such that the first filter output is proportional to the magnitude of the target signal when the target signal is greater in magnitude than the interference signal.

10. The method of claim 8, wherein the second interference attenuation factor is greater than the first interference attenuation factor.

11. A system for adjusting the headroom for a received signal in a radio receiver, the received signal including a target signal and an interference signal, the system comprising:
    an amplification module for amplifying the received signal at an amplification level to form an amplified signal;
    a conversion module for converting the amplified signal to a digital signal;
    a first filtering module for digitally filtering the digital signal at a first interference attenuation factor to produce a first filter output proportional to the magnitude of the interference signal when the interference signal is greater in magnitude than the target signal;
    an adjusting module for adjusting the amplification level of the received signal based on the first filter output such that the difference between the maximum possible digital signal and the amplified signal is decreased when the interference signal is greater than the target signal and thereby to cause the amplification level at which the amplification module amplifies the received signal to be proportional to the magnitude of the interference signal; and
    a second filtering module for digitally filtering the first filter output signal at a second interference attenuation factor.

12. The system of claim 11, wherein the first filtering module and the second filtering module are low pass digital filters.

13. The system of claim 11, wherein the amplification level at which the amplification module amplifies the received signal is algebraically related to the first filter output.

14. The system of claim 11, wherein the amplification level at which the amplification module amplifies the received signals is linearly related to the first filter output.

15. The system of claim 11, wherein the digital signal provided by the conversion module comprises a binary coded decimal signal.

16. The system of claim 15, wherein the analog-to-digital converter is a sigma-delta analog-to-digital converter.

17. The system of claim 11, wherein the second interference attenuation factor is greater than the first interference attenuation factor.

18. The system of claim 11, wherein the first filter output is proportional to the magnitude of the target signal when the target signal is greater in magnitude than the interference signal.

* * * * *